(12) United States Patent
Müller et al.

(10) Patent No.: US 11,440,364 B2
(45) Date of Patent: Sep. 13, 2022

(54) METHOD FOR PRODUCING A COMPONENT, AND COMPONENT

(71) Applicants: ZF FRIEDRICHSHAFEN AG, Friedrichshafen (DE); SCHÄFER MWN GMBH, Renningen (DE)

(72) Inventors: Ingolf Müller, Minfeld (DE); Manfred Bürgmann, Ravensburg (DE); Jens Heimann, Stetten (DE); Andre Stieglitz, Osnabrück (DE); Carsten Sohl, Fredericia (DK); Valentin Hörtdörfer, Stuttgart (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 29 days.

(21) Appl. No.: 16/772,320

(22) PCT Filed: Nov. 16, 2018

(86) PCT No.: PCT/EP2018/081573
§ 371 (c)(1),
(2) Date: Jun. 12, 2020

(87) PCT Pub. No.: WO2019/115146
PCT Pub. Date: Jun. 20, 2019

(65) Prior Publication Data
US 2021/0078375 A1 Mar. 18, 2021

(30) Foreign Application Priority Data
Dec. 13, 2017 (DE) ...................... 10 2017 222 579.3

(51) Int. Cl.
*B60G 7/00* (2006.01)
*F16C 7/02* (2006.01)

(52) U.S. Cl.
CPC .............. *B60G 7/001* (2013.01); *F16C 7/026* (2013.01); *B60G 2204/143* (2013.01);
(Continued)

(58) Field of Classification Search
CPC .............. B60G 7/001; B60G 2204/143; B60G 2204/41; B60G 2206/121;
(Continued)

(56) References Cited

U.S. PATENT DOCUMENTS 369,883 A * 9/1887 Richards ................. F16C 7/023
74/594
2,723,705 A * 11/1955 Collins ................... B29C 53/68
156/177
(Continued)

FOREIGN PATENT DOCUMENTS

EP 0391222 10/1990
EP 2703129 3/2015
(Continued)

OTHER PUBLICATIONS

Office Action dated May 28, 2021, of corresponding German Patent Application No. 10 2017 222 579.3.

*Primary Examiner* — Paul N Dickson
*Assistant Examiner* — Timothy Wilhelm
(74) *Attorney, Agent, or Firm* — Cozen O'Connor (57) ABSTRACT

A method for producing a component by a 3D winding method, a filament or a plurality of parallel filaments having a fiber-reinforced plastic composite material is or are laid down on a core in a combination of a plurality of different winding patterns. Every filament is preimpregnated. Every winding pattern influences at least one mechanical characteristic of the component. The mechanical characteristics of
(Continued)

the component are selectively adjusted by the sequence, repetition, mixing, and material selection of the individual winding patterns.

16 Claims, 6 Drawing Sheets

(52) U.S. Cl.
CPC .... *B60G 2204/41* (2013.01); *B60G 2206/121* (2013.01); *B60G 2206/7101* (2013.01); *B60G 2206/85* (2013.01)

(58) Field of Classification Search
CPC ........ B60G 2206/7101; B60G 2206/85; B60G 2206/12; B60G 7/008; B60G 7/00; B60G 2206/11; B60G 2206/124; F16C 7/026; F16C 2326/01; B29C 53/821; B29C 53/68; B29C 53/62; B29C 53/564
See application file for complete search history.

(56) References Cited

U.S. PATENT DOCUMENTS

| | | | | |
|---|---|---|---|---|
| 3,111,569 | A * | 11/1963 | Rubenstein | B29C 70/083 52/223.14 |
| 3,370,483 | A * | 2/1968 | Ditlinger | F16C 7/026 74/579 R |
| 3,408,124 | A * | 10/1968 | Melton | F16C 11/083 384/130 |
| 3,411,379 | A * | 11/1968 | Deyerling | B29C 70/86 74/579 R |
| 3,475,988 | A * | 11/1969 | Ditlinger | B64C 27/327 74/579 R |
| 3,722,931 | A * | 3/1973 | Uchida | F16C 11/0619 403/140 |
| 4,183,261 | A * | 1/1980 | Eiselbrecher | B29C 70/56 74/579 R |
| 4,300,410 | A * | 11/1981 | Raghupathi | B29C 53/564 156/172 |
| 4,353,267 | A * | 10/1982 | Robert | B29C 53/564 74/579 R |
| 4,411,114 | A * | 10/1983 | Wurtinger | F16C 7/026 403/267 |
| 4,414,860 | A * | 11/1983 | Brunsch | F16C 7/026 74/579 E |
| 4,552,035 | A * | 11/1985 | Skipper | F16C 7/026 74/581 |
| 4,603,084 | A * | 7/1986 | Drachenberg | B29C 53/70 156/166 |
| 4,650,620 | A * | 3/1987 | Owen | B29C 44/12 264/137 |
| 4,671,336 | A * | 6/1987 | Anahara | B22D 19/14 164/110 |
| 4,704,918 | A * | 11/1987 | Orkin | D04C 3/48 403/224 |
| 4,750,960 | A | 6/1988 | Bubeck | |
| 4,772,044 | A * | 9/1988 | Booher | B29C 70/52 267/149 |
| 4,811,626 | A * | 3/1989 | Bezin | B62M 3/00 74/594.1 |
| 4,841,801 | A * | 6/1989 | Tice | F16C 7/026 123/197.3 |
| 4,857,124 | A * | 8/1989 | Shobert | B29C 53/582 156/149 |
| 4,873,889 | A * | 10/1989 | Ditlinger | B29C 53/56 74/579 R |
| 4,992,313 | A * | 2/1991 | Shobert | B29C 53/582 428/36.1 |
| 5,267,751 | A * | 12/1993 | Hiromoto | B60G 3/10 280/124.134 |
| 5,374,780 | A * | 12/1994 | Pazdirek | B29C 70/347 174/137 A |
| 5,397,272 | A * | 3/1995 | Smiley | F16C 3/026 138/109 |
| 5,406,033 | A * | 4/1995 | Pazdirek | B29C 37/0085 174/176 |
| 5,435,869 | A * | 7/1995 | Christensen | B29C 53/564 156/169 |
| 5,556,081 | A * | 9/1996 | Miura | B29C 53/564 267/47 |
| 5,690,034 | A * | 11/1997 | Schahl | B29C 70/086 105/199.1 |
| 5,788,263 | A * | 8/1998 | VanDenberg | B60G 7/001 280/124.116 |
| 6,116,113 | A * | 9/2000 | Pazdirek | B29C 70/86 74/579 R |
| 6,152,433 | A * | 11/2000 | Hettich | B60G 7/001 180/352 |
| 6,202,505 | B1 * | 3/2001 | Auberon | B29C 33/52 74/579 R |
| 6,324,940 | B1 * | 12/2001 | Pazdirek | B60G 7/001 74/579 R |
| 6,371,682 | B1 * | 4/2002 | Maughan | B62D 7/16 403/165 |
| 6,564,675 | B1 * | 5/2003 | Jiang | B62K 19/16 74/579 R |
| 7,013,753 | B2 * | 3/2006 | Valle | B62K 19/16 74/594.1 |
| 7,028,998 | B2 * | 4/2006 | Daily | B60G 21/055 267/148 |
| 7,205,251 | B2 * | 4/2007 | Wellman | B29C 70/081 442/225 |
| 7,753,384 | B2 * | 7/2010 | Kunze | B60G 7/001 280/124.116 |
| 7,918,439 | B2 * | 4/2011 | Morales Arnaez | B29C 45/2673 267/141.3 |
| 7,921,629 | B2 * | 4/2011 | Scholten | D04H 3/10 57/6 |
| 7,980,575 | B2 * | 7/2011 | Quaing | B60G 9/00 280/124.116 |
| 8,024,993 | B2 * | 9/2011 | Dal Pra | B29C 70/86 74/594.1 |
| 8,394,222 | B2 * | 3/2013 | Rettig | B29C 53/588 156/169 |
| 8,617,336 | B2 * | 12/2013 | Kawamura | B29C 53/564 156/194 |
| 8,714,571 | B2 * | 5/2014 | Nataraj | B60G 7/001 280/124.107 |
| 8,777,162 | B2 * | 7/2014 | Benthien | F16C 7/026 244/131 |
| 8,777,244 | B2 * | 7/2014 | Seethaler | B60G 11/06 280/124.145 |
| 8,793,965 | B2 * | 8/2014 | Kurath-Grollmann | B29D 24/002 52/790.1 |
| 8,863,616 | B2 * | 10/2014 | Ciavatta | F16C 3/22 74/594.1 |
| 9,090,289 | B2 * | 7/2015 | Heise | B62D 25/20 |
| 9,168,801 | B2 * | 10/2015 | Dicke | B60G 7/001 |
| 9,259,878 | B2 * | 2/2016 | Valembois | F16C 7/026 |
| 9,393,850 | B2 * | 7/2016 | Kuroda | B60G 7/001 |
| 9,404,249 | B2 * | 8/2016 | Langone | E04B 1/30 |
| 9,555,683 | B2 * | 1/2017 | Eismann | B60G 21/05 |
| 9,610,818 | B2 * | 4/2017 | Mark | B60K 5/1241 |
| 9,616,725 | B2 * | 4/2017 | Kuroda | B60G 7/005 |
| 9,751,564 | B2 * | 9/2017 | Muehlhausen | B62D 65/12 |
| 9,937,657 | B2 * | 4/2018 | Wakeman | B29C 65/02 |
| 10,105,916 | B2 * | 10/2018 | Dal | B29C 70/22 |
| 10,189,326 | B2 * | 1/2019 | Steber | B29C 66/1284 |
| 10,220,666 | B2 * | 3/2019 | Kuroda | F16C 11/0657 |
| 10,350,951 | B2 * | 7/2019 | Meyer | B60G 7/005 |
| 10,487,869 | B2 * | 11/2019 | Beale | F16C 3/026 |
| 10,493,703 | B2 * | 12/2019 | Yasui | B29C 70/30 |
| 10,549,592 | B2 * | 2/2020 | Meyer | B29C 45/14336 |
| 10,850,329 | B2 * | 12/2020 | Tenhaeff | B33Y 80/00 |
| 10,864,788 | B2 * | 12/2020 | Muller | B60G 7/001 |
| 10,919,359 | B2 * | 2/2021 | Rapp | B60G 21/0551 |
| 10,974,559 | B2 * | 4/2021 | Mainz | B60G 7/001 |

(56) References Cited

U.S. PATENT DOCUMENTS

| | | | | |
|---|---|---|---|---|
| 2003/0160414 A1* | 8/2003 | Pincerato | ............... | B60G 7/001 280/93.51 |
| 2005/0044984 A1* | 3/2005 | Jones | ........................ | E04C 3/29 74/579 R |
| 2005/0281610 A1* | 12/2005 | MacLean | ............ | F16C 11/0671 403/56 |
| 2007/0186719 A1* | 8/2007 | Ciavatta | .................. | B29C 70/86 74/594.1 |
| 2007/0199403 A1* | 8/2007 | Ciavatta | .................. | B62M 3/00 74/594.1 |
| 2007/0264470 A1* | 11/2007 | Wellman | ............... | B29C 70/347 428/105 |
| 2009/0014977 A1* | 1/2009 | Molenaar | ............... | B60G 7/001 280/124.134 |
| 2012/0305173 A1* | 12/2012 | Masson | ................. | B29C 70/222 156/185 |
| 2015/0030806 A1* | 1/2015 | Fink | ........................ | B32B 5/028 428/116 |
| 2015/0158361 A1* | 6/2015 | Eismann | .................. | B60G 9/02 280/124.116 |
| 2016/0355914 A1* | 12/2016 | Takemura | ............ | B22D 21/007 |
| 2017/0130764 A1* | 5/2017 | Yasui | ........................ | B64C 9/02 |
| 2018/0126689 A1* | 5/2018 | Gaigler | ................ | B32B 27/12 |
| 2019/0133807 A1* | 5/2019 | Siewert | ................. | A61F 5/0127 |
| 2019/0160903 A1* | 5/2019 | Schramm | ............. | B29C 70/543 |
| 2020/0180376 A1* | 6/2020 | Stieglitz | ................. | B60G 7/001 |
| 2020/0223273 A1* | 7/2020 | Kwon | ............... | B29C 45/14631 |
| 2020/0307333 A1* | 10/2020 | Reddehase | ............ | B60G 7/005 |

FOREIGN PATENT DOCUMENTS

| | | |
|---|---|---|
| WO | WO 9104843 | 4/1991 |
| WO | WO 2006076384 | 7/2006 |
| WO | WO 2009062749 | 5/2009 |
| WO | WO 2017202614 | 11/2017 |

* cited by examiner

METHOD FOR PRODUCING A COMPONENT, AND COMPONENT

CROSS REFERENCE TO RELATED APPLICATIONS

This is a U.S. national stage of Application No. PCT/EP2018/081573 filed Nov. 16, 2018. Priority is claimed on German Application No. DE 10 2017 222 579.3 filed Dec. 13, 2017 the content of which is incorporated herein by reference.

BACKGROUND OF THE INVENTION

1. Field of the Invention

The present invention is directed to a method for producing a component and to such a component.

2. Description of Related Art

Four-point links are used in utility vehicles to guide a rigid axle in a sprung manner in a vehicle frame. The four-point link is responsible for transverse guidance and longitudinal guidance of the axle. Further, the four-point link performs the function of a stabilizer. Three-point links are used in utility vehicles and in passenger vehicles and serve to connect the wheel carrier to the body in an independent suspension. Two-point links or axle struts are utilized as connecting rods for connecting a vehicle axle to a body. Two-point links of this kind can represent simple load situations, e.g., tensile/compressive loading.

A four-point link for a wheel suspension of a vehicle and a method for producing this four-point link are known from PCT/EP2017/061257 (WO 2017/202614 A1). This four-point link is produced by a robotic 3D winding method. However, the above-cited application does not describe exactly how stiffnesses and strengths of the four-point link can be selectively adjusted in this winding method.

SUMMARY OF THE INVENTION

One aspect of the present invention is an improved option for producing a component with a robotic 3D winding method.

One aspect of the present invention is a method for producing a component and a component.

In a method for producing a component by a 3D winding method, a filament or a plurality of parallel filaments comprising a fiber-reinforced plastic composite material (FRP) is or are laid down on a core in a combination of a plurality of different winding patterns. Further, every filament is preimpregnated. Every winding pattern influences at least one mechanical characteristic of the component. The mechanical characteristics of the component are selectively, i.e., precisely, adjusted by the sequence, repetition, mix, and material selection of the individual winding patterns. The component has at least two arms, each of which has a bushing, and a torsion region connected to the at least two arms.

The component can be, for example, a four-point link for a chassis of a vehicle. Alternatively, the component can be a three-point link or a two-point link for a chassis of a vehicle. As a further alternative, the component can be a five-point link for a chassis of a vehicle. As another alternative, the component can be a stabilizer or a control arm for a chassis of a vehicle. As a further alternative, the component can be any component produced by a 3D winding method that receives forces exclusively via the windings of the component and not via a core. The vehicle can be a passenger vehicle or a utility vehicle, for example.

The component has at least two arms which are connected to a torsion region. It will be appreciated that the component may also have three or four arms. This depends on the intended use of the component. Each arm has a bushing. This bushing is arranged at the distal end of the respective arm. The at least two arms are provided, for example, to couple the vehicle axle or wheel carrier to a frame and/or a body of the vehicle. To this end, for example, two arms can be articulated to the vehicle axle or to the wheel carrier, while the two other arms are articulated to the body or frame of the vehicle. "Articulated" as used herein refers to a rotatability around at least one geometric axis. The articulated connection is carried out by the bushings that can receive a joint.

Since the component has the at least two arms and the torsion region, the core likewise has the at least two arms and the torsion region. Every bushing is connected to the core. The core is provided essentially to form the shape of the component. Preferably, the core is not provided for receiving loads but rather exclusively for the deposition of or wrapping with the filament. In other words, the loads and forces that are introduced into the component, e.g., through a vehicle axle or a wheel carrier, are only received by the outer shell (laminate) of the component formed from the filament. Therefore, the filament is connected to the respective bushing at least by frictional engagement. In addition, the filament can also be connected to the respective bushing by positive engagement. Alternatively, the core may have a supporting function. In this case, the core is additionally connected to the laminate so as to be resistant to shear. In this case, the filament is connected to the respective bushing by frictional engagement and possibly by positive engagement.

Each arm is connected to the torsion region. "Torsion region" refers to that area of the component that is instrumental in accommodating torsion when the component is used in a vehicle. The torsion region serves additionally to stabilize the at least two arms against swiveling. The arms and the torsion region are arranged in such a way that a swiveling of the respective arm, that is, a twisting of the respective arm around a torsional axis, is accompanied by a torsion of the torsion region. The torsion occurs as a result of a torsional moment exerted on the torsion region by the respective arm during the swiveling.

By "filament" is meant a reinforcement fiber, a fiber bundle (multifilament, roving) or a textile-processed multifilament. The filament or the filament group preferably comprises a plurality of continuous fibers which are impregnated with a resin. By "filament group" is meant a plurality of filaments that are combined to form a bundle. This bundle in turn constitutes a filament. The filament is preimpregnated with a resin; in particular, a so-called towpreg intermediate or prepreg filament can be used. In the wet winding method, the filament is impregnated with resin immediately before winding and is wound around the core. A maximum lay-up speed of the filament onto the core of approximately 0.5 m/s to 1 m/s is possible as a result of the resin losses caused, e.g., by centrifugal forces during the winding. By comparison, the lay-up speed is substantially increased through the use of preimpregnated filaments because the resin is pre-cured or partially cured and centrifugal forces therefore have no influence. The filament is formed from fiber-reinforced plastic composite material (FRP). The filament is preferably formed from a carbon fiber-reinforced plastic (CFRP), a glass fiber-reinforced plastic (GFRP), an aramid fiber-reinforced plastic (AFRP), or other suitable FRP composite material.

The filament can be tensioned for every winding process; that is, a force can be applied that causes a tensioning of the filament. Consequently, the filament is connected to a respective arm and to the torsion region by frictional engagement. The filament preferably runs in such a way that a swiveling of the respective arm due to the frictional engagement of the filament with the arm induces a force which acts on the filament and which is in turn transferred to the torsion region via the frictional engagement between the filament and the torsion region. The induced force causes an increased tensioning of the filament.

For example, exactly one filament can be wound multiple times around the core and the respective bushing. For example, the filament is unwound in an automated manner from a winding axis and systematically wound onto the core, preferably by a robot, to form the component. Alternatively, winding can be carried out by a 5-axis winding machine. However, it is also conceivable that two or more robots wind a respective filament around the core simultaneously to form the component. The winding process takes place three-dimensionally. Production time is reduced when using a plurality of parallel filaments instead of an individual filament. Owing to the tackiness of the preimpregnated filament and the three-dimensional rotation of the filament and component by one or more robots or rotary frames, curved winding paths can be generated outside of the geodesic lines of the component.

The core is preferably formed from a foam material. In particular, the core is formed from a sturdy, lightweight, permanent foam material. The foam material is preferably formed from a polymer, for example, polyurethane, polypropylene, or polystyrene. Further, the core can also be formed as inline core, disposable core, or blow core. In particular, it is key that the core can be wrapped with the filament and thus serves to impart shape.

The bushings are preferably formed from a metal material. In particular, every bushing can be formed from a steel alloy or a light metal alloy, particularly an aluminum alloy or magnesium alloy. Further, every bushing is at least glued to the core. The core receives the bushing during the winding process in such a way that its position is secured. In addition, the core material can be sprayed around the bushings so that a positive engagement is formed.

The filament or the parallel filaments are laid down on the core in a succession of winding patterns to produce the outer shape of the component. The winding patterns are combined to selectively adjust, i.e., produce, mechanical characteristics of the finished component. These mechanical characteristics are determined by the type and intended use of the component. The mechanical characteristics of importance when the component is used in a utility vehicle are different than those when the component is used in a passenger vehicle. Mechanical characteristics which can be adjusted may be a torsional stiffness for roll stabilization, a high lateral stiffness for guiding a vehicle axle, a longitudinal compliance with respect to improved comfort and/or kinematics or elasto-kinematics over a spring deflection. For example, the torsional stiffness for roll stabilization is selected to be lower in a passenger vehicle than in a commercial vehicle.

In order that these mechanical characteristics can be selectively adjusted, those winding patterns that influence the required mechanical characteristics are selected in a predetermined sequence, in a predetermined quantity and in a predetermined mixture. Accordingly, the filament is laid down on the core in the form of the respective winding pattern; that is, the influencing of at least one mechanical characteristic of the component in its entirety is associated with each winding pattern. A winding pattern can be used one time, for example, during the production of the component so that the mechanical characteristics associated with this winding pattern are influenced to a lesser extent than when the winding pattern is repeated multiple times. For example, a high torsional stiffness of the component overall can be achieved in that the filament is repeatedly laid down in a winding pattern which influences a shear stiffness of the torsion region. Further, a plurality of winding patterns may be mixed to a greater or lesser extent; that is, the filament can be laid down in winding pattern packages or alternating winding patterns. In this regard, an intensive mixing of winding patterns is to be provided so that a continuous load transfer can be carried out within the laminate.

Further, two or more different winding patterns succeed one another in order to ensure a load transfer of a sub-portion of the component to another sub-portion of the component. For example, one of the at least two arms can be connected to the torsion region by a winding pattern and, subsequently, another of the at least two arms can be connected to the torsion region by a further winding pattern. Accordingly, the two arms can transfer loads into the torsion region.

Further, material amassments and localized thickening are prevented through judicious combination of the winding patterns. A surface of the component that is as flat and uniform as possible is aimed for. Voids and/or resin windings in the laminate are to be prevented. This is made possible, e.g., by alternating the winding patterns so that thickness is developed uniformly during winding. Alternatively, thickening of the laminate, e.g., an external framework, can also be selectively produced when the corresponding structural characteristics are required. Further, closed or open laminates which are formed in the manner of a framework or with continuous surface can be realized by judicious combination of winding patterns. The exact sequence, repetition and mixing of winding patterns are preferably determined by a digital simulation.

In order to selectively influence stiffnesses and strengths of the component overall, it should be kept in mind that the winding patterns located farther outward in the laminate have a greater influence on these stiffnesses and strengths because they have higher area moments of inertia than the winding patterns located farther inward. This can be utilized for fine adjustment of the mechanical characteristics. The coarse adjustment can be influenced by the quantity of repetitions of winding patterns. Winding patterns located farther outward are those which are wound later in time during the production of the component. Alternatively, different winding patterns can also be emphasized or deemphasized through a selective choice of materials. For example, a first winding pattern can be produced by a CFRP filament, and a second winding pattern can be produced by a GFRP filament.

The present method is advantageous in that it is a robust, flexible and fast production method. The filament is laid down in a fiber-optimized manner. A high winding speed can be used so as to accelerate the production of the components for series manufacturing. In addition, the present production method is modular. This means that the same method can be adapted in a simple manner to components of different dimensions for different purposes of use. Accordingly, variants of a basic structure for these different purposes of use can also be produced at low cost. Further, the component produced in this way has a smaller mass than comparable components made of metal materials. Therefore, the component is a lightweight component.

According to an embodiment form, the filament is guided substantially parallel to a longitudinal axis of one of the arms in a first winding pattern. The filament is wound radially around this arm and around the torsion region of the core resulting in an I-shape. Accordingly, unidirectional filament layers are formed. A strength and a flexural rigidity of this arm are produced in this way. Each arm of the component can be wrapped with the filament in this first winding pattern.

As used herein, "substantially parallel" means that the filament is guided at an angle of approximately 0° relative to the longitudinal axis of the arm. This comprehends deviations of approximately ±5°. The longitudinal axis of an arm is that geometric axis that extends from the distal end to the proximal end of the arm. For example, the first winding pattern can be used in an axle strut, a three-point and in a four-point link.

According to a further embodiment form, in a second winding pattern the filament is guided substantially parallel to a longitudinal axis of a first one of the arms, substantially parallel to a longitudinal axis of a second one of the arms and in a web diagonal to a longitudinal axis of the torsion region. These two arms lie opposite one another at the longitudinal axis of the torsion region. The longitudinal axis of the torsion region is perpendicular to a transverse axis of the torsion region. If the component is formed, for example, as a four-point link, the longitudinal axis of the torsion region is oriented transverse to the longitudinal axes of the arms. Further, the two arms can be located opposite one another at the transverse axis of the torsion region. In other words, the two arms are located diagonally opposite one another at the longitudinal axis and at the transverse axis.

The filament is wound radially around these two arms and in a web or in a strand around the torsion region of the core resulting in a Z-shape. In so doing, the orientation of the filament that is wound around the torsion region in a web is, e.g., approximately ±45° relative to the longitudinal axis of the torsion region. The winding results in unidirectional fiber layers in the area of the arms and in a cross-ply laminate in the area of the torsion region. In a cross-ply laminate, the filament layers are arranged at an angle to an axis, i.e., in this case, at an angle of approximately ±45° relative to the longitudinal axis of the torsion region.

By the second winding pattern, load paths are established between these two arms and a connection is produced between these arms and the torsion region. Accordingly, a force is transmissible from the arms into the torsion region. This means that when the component is used in a vehicle the force can be transmitted from the arms into the torsion region during a load case. For example, the second winding pattern can be used both in a three-point link and in a four-point link.

According to a further embodiment form, in a third winding pattern the filament is guided at the transition areas of the torsion region to the arms diagonal to the longitudinal axis of the torsion region. The filament is wound radially around each of these transition areas of the core such that, e.g., a V-shape or lozenge shape results. The transition area between the torsion region and an arm is that area in which the arm is connected by its proximal end to the torsion region. The orientation of the filament in these transition areas can amount to approximately ±45° relative to the longitudinal axis of the torsion region.

A shear stiffness of the torsion region is increased by the third winding pattern. This increase occurs primarily at the wrapped transition areas. The resulting laminate is substantially involved in the shear conductance of the torsion region. Further, a load can be conveyed from the arms to the torsion region by the third winding pattern when the component is used in a vehicle and a load case occurs. For example, the third winding pattern can be used in a three-point link as well as in a four-point link.

According to a further embodiment form, in a fourth winding pattern the filament is guided substantially parallel to a longitudinal axis of a first one of the arms, substantially parallel to a longitudinal axis of a third one of the arms, and in two webs diagonal to the longitudinal axis of the torsion region. These two arms are located opposite one another at a transverse axis of the torsion region. The filament is wound radially around these two arms and in two webs or in two strands around the torsion region of the core resulting in a W-shape. In this regard, the orientation of the filament that is wound around the torsion region in two webs is, e.g., approximately ±60° relative to the longitudinal axis of the torsion region. The winding results in unidirectional fiber layers in the area of the arms and in a cross-ply laminate in the area of the torsion region with an angle of approximately ±60° relative to the longitudinal axis of the torsion region.

Load paths are established between these two arms by the fourth winding pattern. Further, a connection is produced between these arms and the torsion region. Accordingly, a force is transmissible into the torsion region. This means that when the component is used in a vehicle the force can be transmitted from the arms into the torsion region during a load case. For example, the fourth winding pattern can be used both in a three-point link and in a four-point link.

According to a further embodiment form, in a fifth winding pattern the filament is guided at two arms located opposite one another at the transverse axis of the torsion region as at least one cross winding per arm and in two webs diagonal to the longitudinal axis of the torsion region. The two webs which are diagonal to the longitudinal axis of the torsion region serve as back anchoring of the filament at the torsion region.

The cross windings are arranged at the sides of the arms. These sides are oriented such that they lie in a geometric plane that is defined by the transverse axis of the torsion region and by a vertical axis of the torsion region, where the vertical axis is perpendicular to the longitudinal axis of the torsion region. The cross winding can be arranged at each arm either near the distal end or near the proximal end. That is, the arrangement of the cross winding is identical in each arm. In this case, the cross windings are preferably arranged at an outer side of each arm. An outer side is that side of an arm that is remote of the other arms.

Alternatively, the cross winding of a first arm can be arranged at the distal end thereof, and the cross winding of a third arm can be arranged at the proximal end thereof. As a further alternative, a first cross winding of the first arm can be arranged near the proximal end thereof, and the second cross winding of the first arm can be arranged near the distal end thereof. This can also apply to the third arm. Each arm then has two cross windings. The first cross winding of an arm is preferably arranged at the outer side thereof, and the second cross winding of the same arm is preferably arranged at the inner side thereof. It will be appreciated that this arrangement can also be reversed.

The filament is wrapped around the two arms and radially in two webs or in two strands around the torsion region of the core as one, two or more cross windings so that an X-shape results at the sides of the respective arms.

A shear formation is produced by the fifth winding pattern. In this way, shear forces can be received at the arms of the component when the component is used in a vehicle and a load case occurs. For example, the fourth winding pattern can be used in a three-point link as well as in a four-point link.

According to a further embodiment form, in a sixth winding pattern the filament is guided around each bushing as ring windings and cross windings. Therefore, these bushings are anchored at the core. The ring windings and cross windings result in a frictional engagement and a positive engagement between the bushings and the filament and between the bushings and the laminate of the component in its entirety.

By the sixth winding pattern, loads, e.g., transverse forces and lateral forces, can be introduced into the laminate of the component when the component is used in a vehicle and a load case occurs. For example, the sixth winding pattern can be used in an axle strut as well as in a three-point link and in a four-point link.

According to a further embodiment form, in a seventh winding pattern the filament is guided as circumferential winding around at least one of the arms and/or around the torsion region.

The filament is guided radially around the longitudinal axis of the at least one arm of the core. However, the orientation is to be distinguished from that of the first winding pattern. In the seventh winding pattern, the filament is oriented substantially perpendicular to the filament that was wound according to the first winding pattern. Further, the filament is accordingly oriented substantially perpendicular to the longitudinal axis of the respective arm; that is, the filament is wound around the at least one arm in an O-shape. It will be appreciated that a circumferential winding can be wound around more than one arm.

Additionally or alternatively, the filament is guided radially around the longitudinal axis of the torsion region of the core. In so doing, the filament is oriented substantially perpendicular to the longitudinal axis of the torsion region; that is, the filament is wound around the torsion region in an O-shape. As used herein, "substantially perpendicular" means that the filament is oriented at approximately 90° to the longitudinal axis of the arm or of the torsion region. This includes deviations of approximately ±5°.

By the seventh winding pattern, the laminate of the component can be compacted at at least one arm or at all of the arms and at the torsion region. In addition, a closed surface of the component is formed in this way. For example, the seventh winding pattern can be used in an axle strut, in a three-point link and in a four-point link.

According to a further embodiment form, in an eighth winding pattern the filament is guided at the torsion region in four webs diagonal to the longitudinal axis of the torsion region and diagonal to the transverse axis of the torsion region. The filament is guided radially around the torsion region of the core, and this is effected in four webs. The filament preferably has an orientation of approximately ±35° with respect to the longitudinal axis of the torsion region. A parallelogram shape results, wherein two webs always have the same orientation. These two webs are preferably arranged in the area where the arm transitions into the torsion region, the two arms being located diagonally opposite one another at the longitudinal axis of the torsion region and at the transverse axis of the torsion region.

A shear stiffness of the torsion region is increased by the eighth winding pattern. The resulting laminate is substantially involved in the shear conductance of the torsion region. Further, a load can be conveyed from the arms to the torsion region by the eighth winding pattern when the component is used in a vehicle and a load case occurs. For example, the eighth winding pattern can be used in a three-point link as well as in a four-point link.

According to a further embodiment form, in a ninth winding pattern the filament is guided at the torsion region substantially parallel to the longitudinal axes of at least two of the arms. In so doing, the filament is guided radially around the torsion region of the core. One web of the filament is oriented, e.g., substantially parallel to the longitudinal axis of the first arm, and a further web of the filament is preferably oriented substantially parallel to the longitudinal axis of the third arm. These two arms are located opposite one another at the transverse axis of the torsion region. Further, the filament has, e.g., an orientation of approximately ±60° with respect to the longitudinal axis of the torsion region.

A shear stiffness of the torsion region is increased by the ninth winding pattern. The resulting laminate is substantially involved in the shear conductance of the torsion region. Further, large loads can be transferred from the arms into the torsion region when the component is used in a vehicle and a load case occurs. This is particularly advantageous when the ninth winding pattern is combined, e.g., with the first, the second or the fourth winding pattern. The maximum load bearing capacity of the laminate is increased in this way. For example, the ninth winding pattern can be used in an axle strut, in a three-point link, and in a four-point link.

According to a further embodiment form, in a tenth winding pattern the filament is guided at the torsion region substantially parallel to the longitudinal axis of one of the arms. In so doing, the filament is guided radially around the torsion region of the core. The webs of the filament are oriented, for example, substantially parallel to the longitudinal axis of the first arm. Further, the filament has, e.g., an orientation of approximately ±45° with respect to the longitudinal axis of the torsion region.

A shear stiffness of the torsion region is increased by the tenth winding pattern. The resulting laminate is substantially instrumental in the shear conductance of the torsion region. For example, the tenth winding pattern can be used in an axle strut, in a three-point link, as well as in a four-point link.

According to a further embodiment form, the core is received at a robot arm, and the core is guided by the robot arm as the filament is being wound around the core. The robot arm is moveable in three dimensions. For example, the filament is unwound from a winding axis and wound around the core. The filament is preferably formed as towpreg.

According to a further embodiment form, the core is received at a geometric axis, and the filament is guided by a robot arm in order to wind the filament around the core. The axis is preferably rotatably mounted. Alternatively, one or more changes in the stationary winding axis (rechucking) are made in the course of the winding process.

A component has at least two arms, each of which has a bushing, and a torsion region which is connected to the at least two arms. Further, the component has a core around which a filament is wound in such a way that a laminate formed of an FRP results. The component is produced according to the method described in the preceding description. The laminate serves to receive loads. The core serves exclusively for deposition or wrapping with the filament.

According to an embodiment form, the component is a component for a chassis of a vehicle. The component can be, e.g., a four-point link, a five-point link, a three-point link, or a two-point link. These components can be used for a wheel suspension of the vehicle. The vehicle can be, e.g., a passenger vehicle or a utility vehicle.

BRIEF DESCRIPTION OF THE DRAWINGS

Various embodiment examples and details of the invention will be described more fully referring to the drawings described in the following. The drawings show.

DETAILED DESCRIPTION OF THE PRESENTLY PREFERRED EMBODIMENTS

Figure 1:
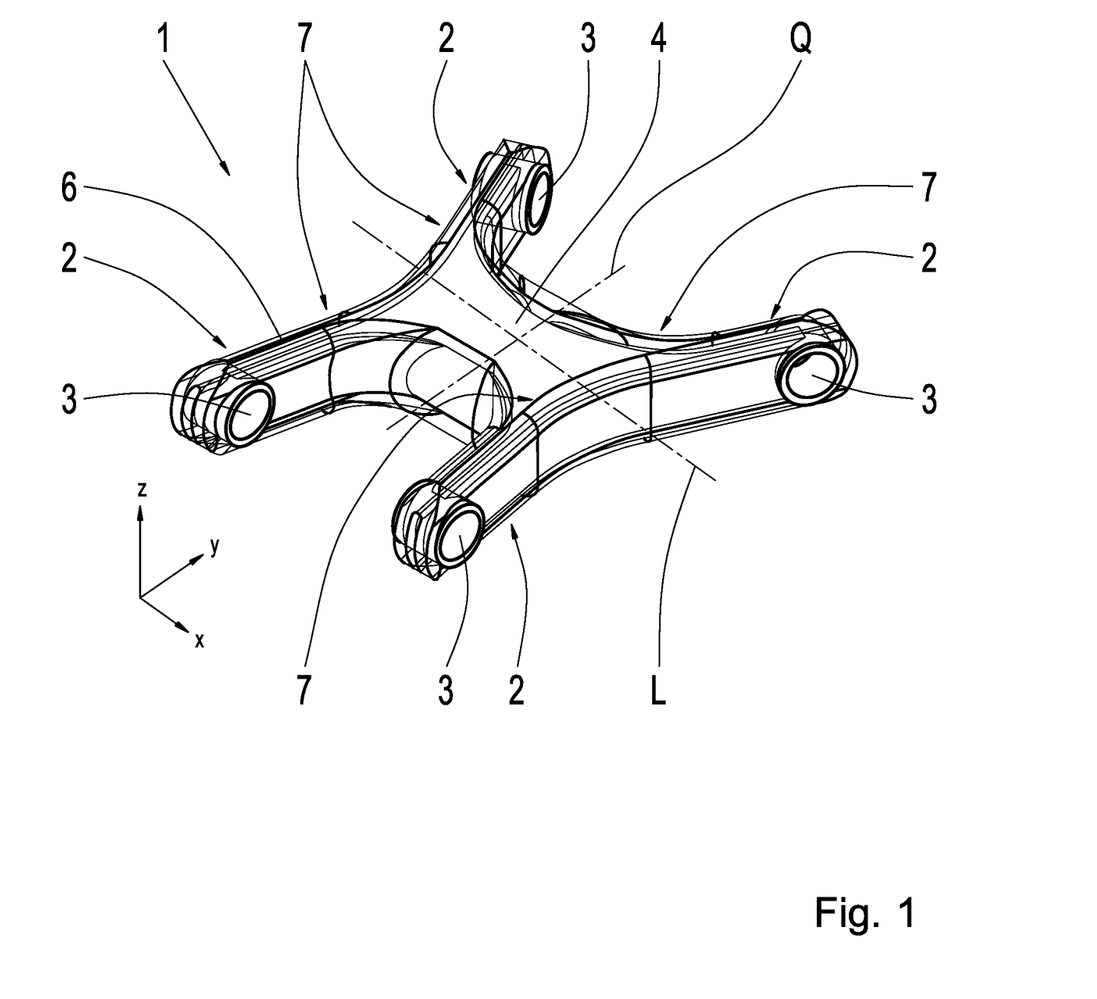
FIG. 1 is a schematic view of a component according to an embodiment example.

FIG. 1 shows a schematic view of a component 1 according to an embodiment example. Component 1 is formed as a four-point link for a wheel suspension of a vehicle. The component 1 shown here is a lightweight element having a foam core, not shown. Further, component 1 has a filament 6 formed from an FRP which is wound around this core and accordingly forms the laminate of component 1. A Cartesian coordinate system is also shown in the drawing.

Component 1 has four arms 2 and a torsion region 4. All four arms 2 are connected to the torsion region 4. Each arm 2 has a bushing 3 which serves to receive a bearing or a joint. The component 1 has a transition area 7 between each arm 2 and the torsion region 4. This transition area 7 forms the proximal end of each arm 2. The bushing 3 of an arm 2 is arranged at the distal end thereof.

The component 1 shown here is formed symmetric to a transverse axis Q of the torsion region 4. Further, the torsion region 4 has a longitudinal axis L which is perpendicular to the transverse axis Q. The longitudinal axis L and the transverse axis Q are both geometric axes.

Component 1 is formed in such a way that forces and loads which are introduced into the component 1 via the bushings 3 are received exclusively via the laminate formed by the filament 6. The core, not visible here, does not take part in load carrying. The laminate of component 1 is formed by the filament 6, which is laid down on the core, not shown. This deposition is carried out in the form of winding patterns shown in more detail in the following figures. Each winding pattern is assigned a particular task for influencing one or more mechanical characteristics of component 1. This is likewise shown in more detail in the following figures.

Figure 2:
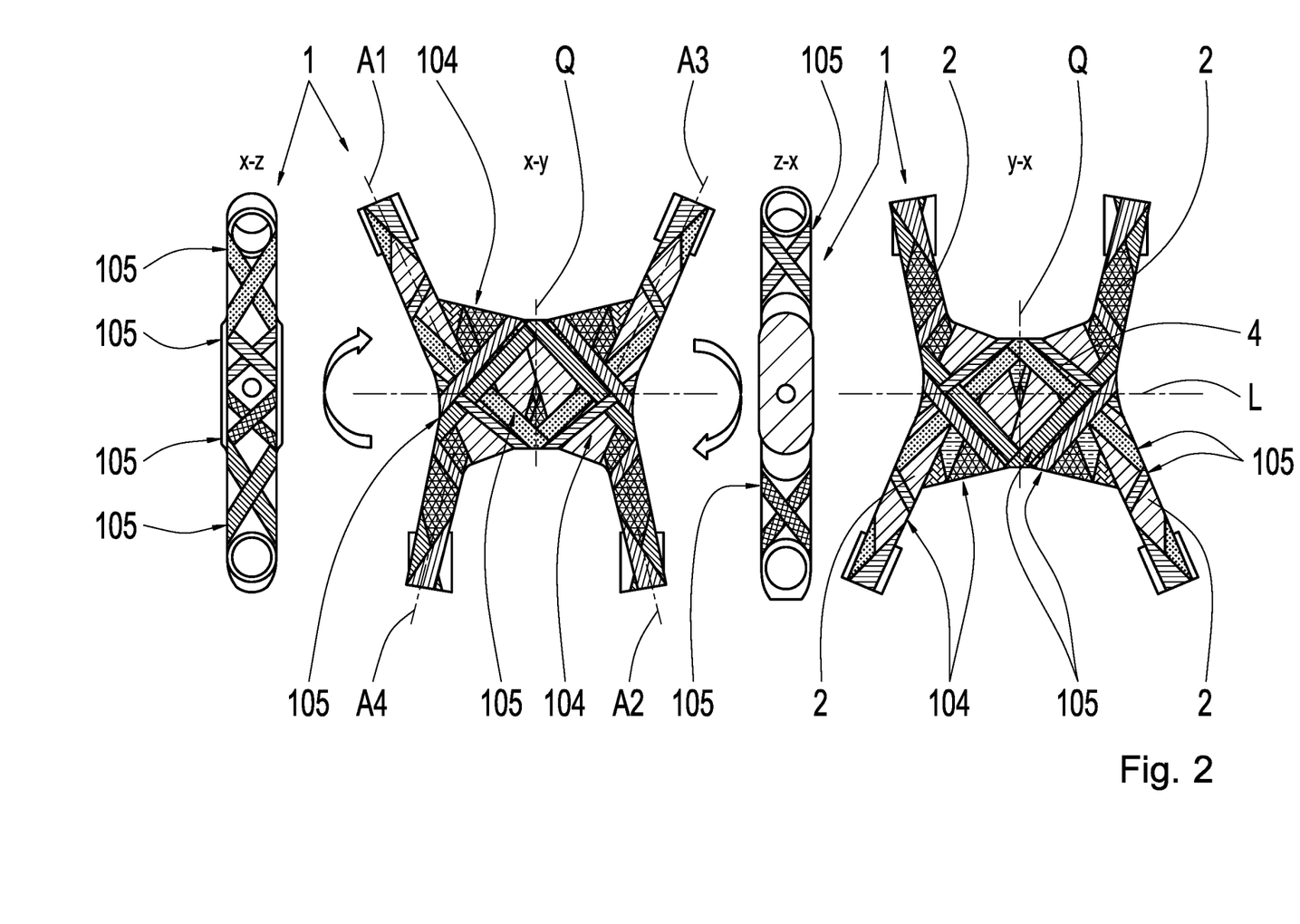
FIG. 2 is a schematic view of the component from FIG. 1 with visible winding patterns.

FIG. 2 shows a schematic view of the component 1 from FIG. 1 with two visible winding patterns 104, 105. For the sake of clarity, only these two winding patterns 104, 105 are shown in different variants. FIG. 2 shows the fourth winding pattern 104 in two variants and the fifth winding pattern 105 in four variants. Further, the laminate is shown here not closed so that the core 5 is visible. Component 1 is shown in four views: a top view in the xy plane, a top view in the yx plane, a side view in the xz plane and another side view in the zx plane. The turning of component 1 around the longitudinal axis L of the torsion region 4 is illustrated by the arrows. Longitudinal axes A1, A2, A3, A4 of the four arms 2 of component 1 are also shown in the drawing. The transverse axis of the torsion region 4 is also shown in the drawing.

In the fourth winding pattern 104 shown here, the filament 6 is guided substantially parallel to the longitudinal axis A1 of the first arm 2 and substantially parallel to the longitudinal axis A3 of the third arm 2 and in two webs diagonal to the longitudinal axis L of the torsion region 4. Further, the fourth winding pattern 104 is carried out a second time in a mirror image across the longitudinal axis L of the torsion region 4. Filament 6 is guided substantially parallel to a longitudinal axis A2 of a second arm 2 and substantially parallel to a longitudinal axis A4 of a fourth arm 2 and in two webs diagonal to the longitudinal axis L of the torsion region 4. Accordingly, the fourth winding pattern 104 forms a W-shape with filament 6.

Load paths are produced between the first arm and third arm 2 and between the second arm and fourth arm 2 by the fourth winding pattern 104. Further, a connection is produced between the first arm and third arm 2 and the torsion region 4. A connection is also produced between the second arm and fourth arm 2 and the torsion region 4. Accordingly, a force can be transmitted from the arms 2 into torsion region 4.

The fifth winding pattern 105 is used four times in FIG. 2. Two variants are to be distinguished. These two variants of the fifth winding pattern 105 are laid down in a mirror image across the longitudinal axis L of the torsion region 4.

In a first variant of the fifth winding pattern 105, a cross winding is laid down at one side of the first arm 2 and at one side of the third arm 2 near the distal end of the respective arm. Further, the filament 6 is guided in two webs diagonal to the longitudinal axis L of the torsion region 4. These diagonal webs serve to anchor the filament 6 to the torsion region 4. The cross windings in this case are located at an outer side of the component 1 which can be seen in the xz plane.

In a second variant of the fifth winding pattern 105, two cross windings are laid down at each arm 2. A first cross winding is laid down near the proximal end of the respective arm 2, and a second cross winding is laid down near the distal end of the respective arm 2. One cross winding is located on the outer side of the respective arm 2 and one cross winding is located on the inner side of the respective arm 2. Here, the inner side is shown by the zx plane. The filament 6 is in turn back-anchored to the torsion region 4 with two webs. In this second variant of the winding pattern 105, the first arm 2 and the third arm 2 each have two cross windings.

Accordingly, since the fifth winding pattern 105 is again laid down in a mirror image across the longitudinal axis L, the second arm 2 and the fourth arm 2 also each have two cross windings according to the second variant and one cross winding according to the first variant of the fifth winding pattern 105. A shear formation is produced by the fifth winding pattern. The transverse forces can be received at the arms 2 of component 1 through this shear formation.

In the following figures, the individual winding patterns 101, 102, 103, 104, 105, 106, 107, 108, 109, 110 are shown more precisely for better clarity.

Figure 3:
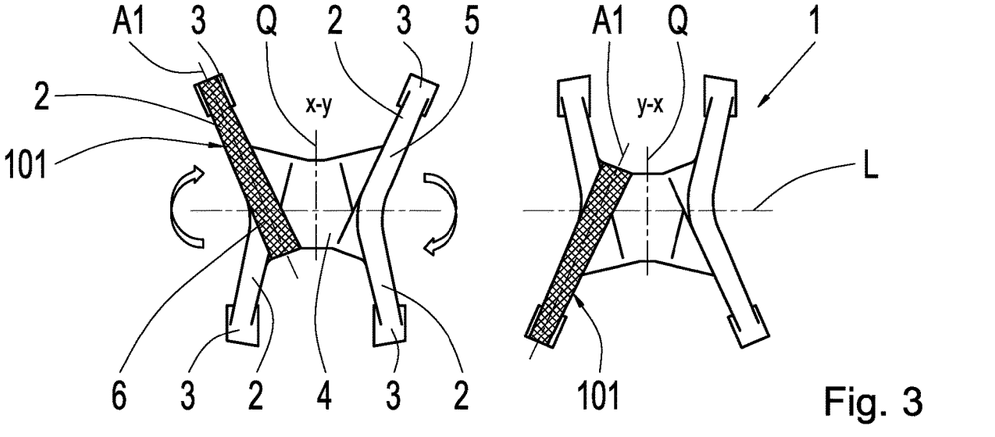
FIG. 3 is a schematic view of the component from FIG. 1 with visible first winding pattern.

FIG. 3 shows a schematic view of the component 1 from FIG. 1 with visible first winding pattern 101. Component 1 is shown in an xy plane and a yx plane. The filament 6 is guided substantially parallel to the longitudinal axis A1 of the first arm 2. It will be appreciated that the filament 6 can also be guided substantially parallel to the longitudinal axis A2 of the second arm 2 or to the longitudinal axis A3 of the third arm 2 or to the longitudinal axis A4 of the fourth arm 2. Accordingly, the filament 6 is laid down in an I-shape. The filament 6 is wound radially around the first arm 2 of the core 5 and around the torsion region 4 of the core 5. The fiber layers of the filament 6 are unidirectional. Winding pattern 101 serves to produce and improve a strength and a flexural stiffness of the respective arm 2, namely, in this case, the first arm 2.

Figure 4:
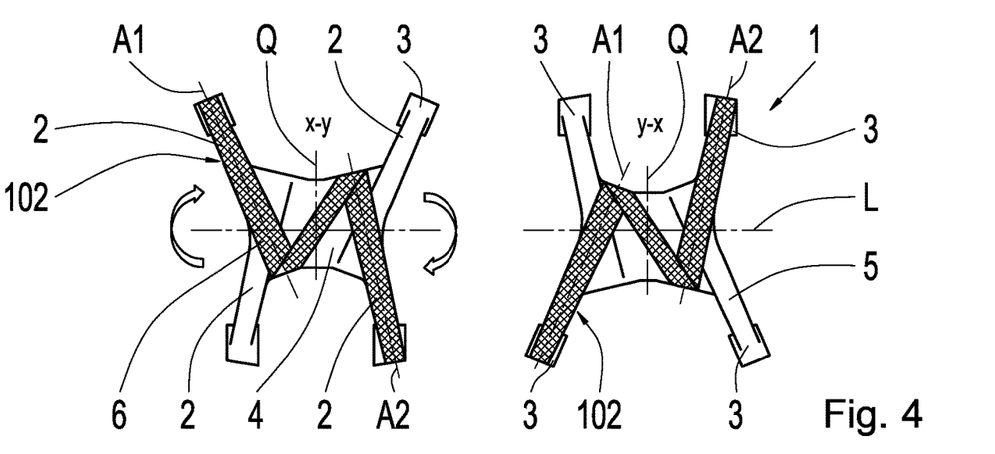
FIG. 4 is a schematic view of the component from FIG. 1 with visible second winding pattern.

FIG. 4 shows a schematic view of the component 1 from FIG. 1 with visible second winding pattern 102. In this second winding pattern 102, the filament 6 is guided substantially parallel to the longitudinal axis A1 of the first arm 2, substantially parallel to the longitudinal axis A2 of the second arm 2 and in a web diagonal to the longitudinal axis L of torsion region 4. Further, the web is diagonal to the transverse axis Q of torsion region 4. The orientation of this web amounts to approximately 45° with respect to the longitudinal axis L of torsion region 4. An xy plane and a yx plane are shown.

The filament 6 is guided radially around the first arm 2 and second arm 2 and radially around torsion region 4. Accordingly, the two arms 2 which are located diagonally opposite one another at the longitudinal axis L and at the transverse axis Q of torsion region 4 are connected to one another. Further, these arms 2 are connected to the torsion region 4. The filament 6 is laid down on the core 5 in a Z-shape. Accordingly, a force can be transferred from the arms 2 into the torsion region 4. Accordingly, load paths result between the two arms 2.

It will be appreciated that this second winding pattern 102 can also be applied in a mirror image. The third arm 2 can be connected to the fourth arm 2. Further, the third arm 2 and the fourth arm 2 are connected to the torsion region 4.

Figure 5:
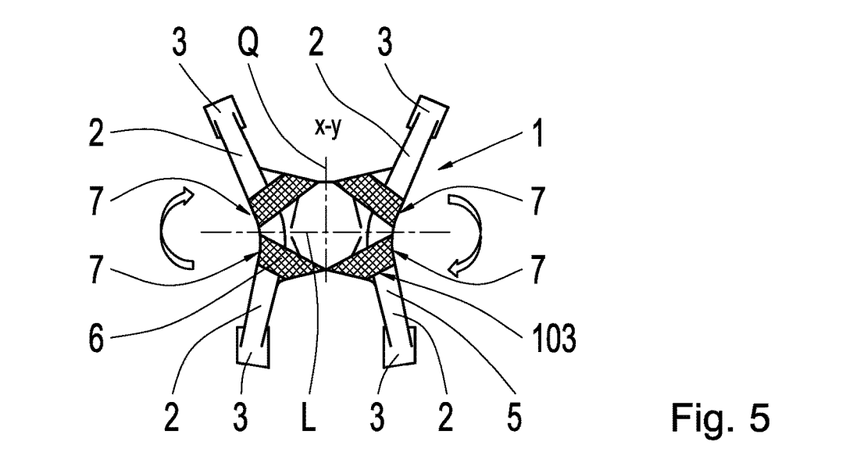
FIG. 5 is a schematic view of the component from FIG. 1 with visible third winding pattern.

FIG. 5 shows a schematic view of the component 1 from FIG. 1 with visible third winding pattern 103. The filament 6 is guided at the transition areas 7 between the torsion region 4 and the four arms 2 diagonal to the longitudinal axis L of the torsion region 4. The filament 6 is guided radially around each of these transition areas 7 of the core 5. Accordingly, the filament 6 is laid down on the core 5 in the shape of a lozenge. This is shown in an xy plane. The filament 6 is oriented with respect to the longitudinal axis L of torsion region 4 approximately at a 45° angle for each transition area 7. A shear stiffness of the torsion region 4 is increased by the third winding pattern 103. This becomes evident primarily at the wrapped transition areas 7. Further, a load can be conveyed from the arms 2 to the torsion region 4.

Figure 6:
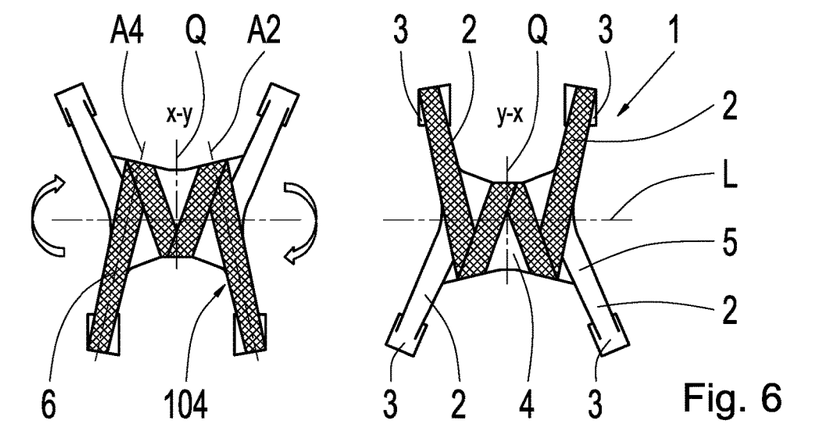
FIG. 6 is a schematic view of the component from FIG. 1 with visible fourth winding pattern.

FIG. 6 shows a schematic view of the component 1 from FIG. 1 with visible fourth winding pattern 104. In this fourth winding pattern 104, the filament 6 is guided substantially parallel to the longitudinal axis A4 of the second arm 2 and substantially parallel to the longitudinal axis A2 of the fourth arm 2 and in two webs diagonal to the longitudinal axis L of torsion region 4. Accordingly, filament 6 winds radially around the longitudinal axis A4 of the fourth arm 2, radially around the longitudinal axis A2 of the second arm 2 and radially around torsion region 4. The filament 6 is laid down on the core 5 in a W-shape. This is shown in an xy plane and a yx plane.

It will be appreciated that the fourth winding pattern 104 can also be laid down in a mirror image at longitudinal axis L of torsion region 4. In this way, the filament 6 would be guided substantially parallel to the longitudinal axis A1 of the first arm 2 and substantially parallel to the longitudinal axis A3 of the third arm 2 and in two webs diagonal to the longitudinal axis L of the torsion region 4. This fourth winding pattern 104 was already shown in FIG. 2.

Figure 7:
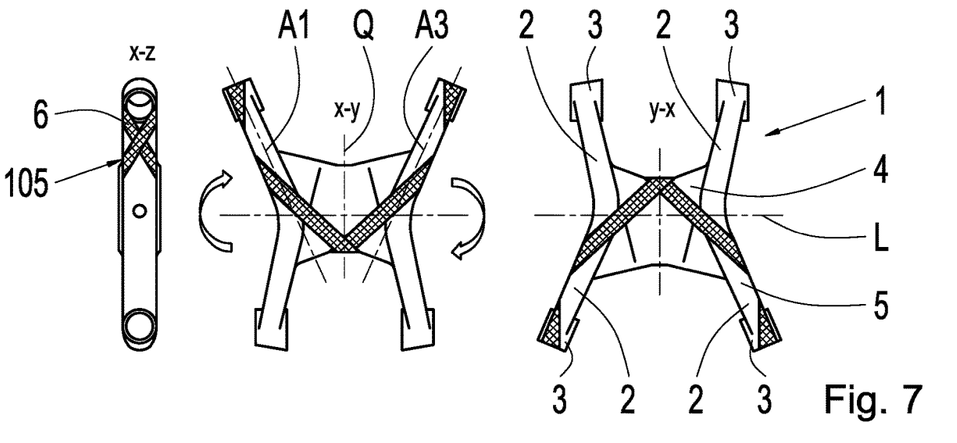
FIG. 7 is a schematic view of the component from FIG. 1 with visible fifth winding pattern in a first variant.

FIG. 7 shows a schematic view of the component 1 from FIG. 1 with visible fifth winding pattern 105 in a first variant. This was already shown in FIG. 2. The filament 6 is guided at the first arm 2 and at the third arm 2 as one cross winding per arm 2 and in two webs diagonal to the longitudinal axis L of the torsion region 4. The two webs arranged diagonal to the longitudinal axis L of the torsion region 4 serve to back-anchor the filament 6 to the torsion region 4. The cross windings are arranged, respectively, at the outer side of component 1. This is seen in the xz plane. Both the first arm 2 and the third arm 2 have a cross winding. It will be appreciated that the fifth winding pattern 105 can also be carried out in a mirror image across the longitudinal axis L of the torsion region 4. In this case, the fourth arm 2 and the second arm 2 would also have a cross winding in each instance.

The cross windings are arranged near the distal end of the respective arm 2. The arms 2 of component 1 which are located opposite one another at the transverse axis Q of torsion region 4 are those having cross windings. A shear formation is produced by the fifth winding pattern 105 in the first variant. Transverse forces can be received at the arms 2 of the component 1 through this shear formation.

Figure 8:
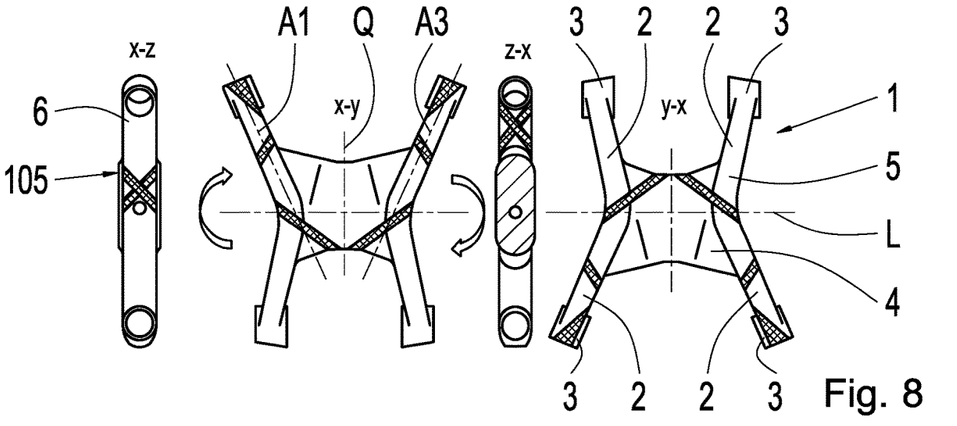
FIG. 8 is a schematic view of the component from FIG. 1 with visible fifth winding pattern in a second variant.

FIG. 8 shows a schematic view of the component 1 from FIG. 1 with visible fifth winding pattern 105 in a second variant. This second variant was also shown in FIG. 2. In this case, the filament 6 is guided in two cross windings per arm 2 and in two webs that are arranged diagonal to the longitudinal axis L of the torsion region 4. A first cross winding of the first arm 2 is located at the outer side of the component 1, and a second cross winding of the same arm 2 is located at the inner side of component 1. This is also the case for the third arm 2. The outer side is shown in the xz plane, whereas the inner side is shown in the zx plane. The cross windings at the outer side of component 1 are arranged near the proximal end of the respective arm 2, but the cross windings at the inner side of component 1 are arranged near the distal end of the respective arm 2. Both the first arm 2 and the third arm 2 have two cross windings in each instance.

It will be appreciated that the fifth winding pattern 105 in the second variant can be carried out in a mirror image across the longitudinal axis L of torsion region 4. In this case, the fourth arm 2 would have two cross windings and the second arm 2 would also have two cross windings. The arms 2 of the component 1 which are located opposite one another at the transverse axis Q of the torsion region 4 are those having the cross windings. Like the fifth winding pattern 105 in the first variant which was shown in FIG. 7, the fifth winding pattern in the second variant also serves to produce a shear formation.

Figure 9:
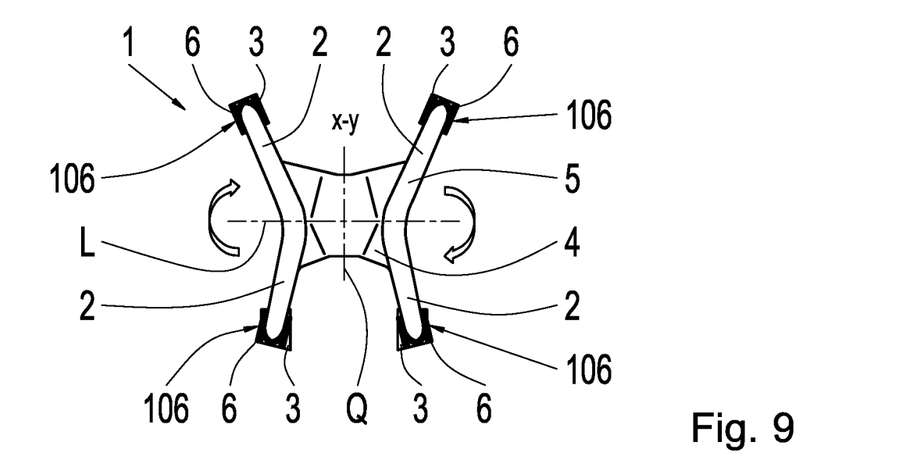
FIG. 9 is a schematic view of the component from FIG. 1 with visible sixth winding pattern.

FIG. 9 shows a schematic view of the component 1 from FIG. 1 with visible sixth winding pattern 106. In this case, it is shown that the filament 6 is laid down on the core 5 four times by the sixth winding pattern 106. An xy plane of the component 1 is shown. In this sixth winding pattern 106, the filament 6 is guided around each bushing 3 as ring windings and cross windings. Accordingly, the bushings 3 are securely anchored to the core 5. These ring windings and cross windings give rise to a frictional engagement and a positive engagement between the bushings 3 and filament 6 and, therefore, between the bushings 3 and the laminate of component 1 in its entirety. By the sixth winding pattern 106, it is possible to introduce transverse forces and lateral forces into the laminate of component 1.

Figure 10:
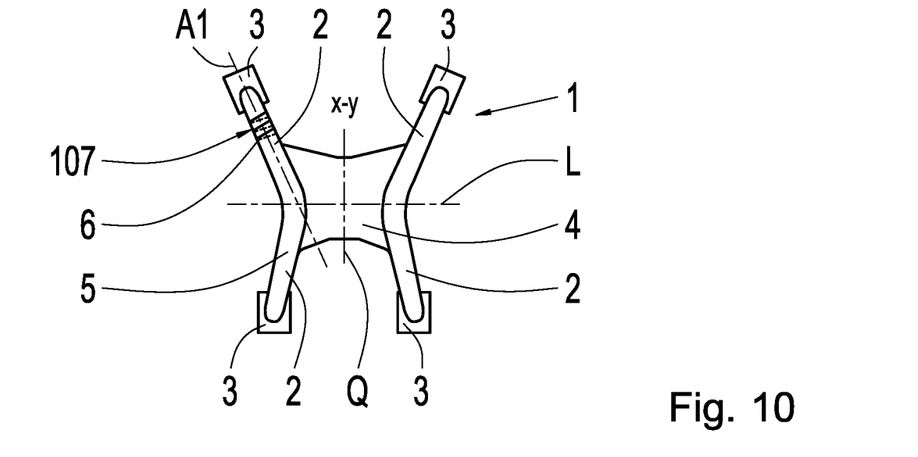
FIG. 10 is a schematic view of the component from FIG. 1 with visible seventh winding pattern in a first variant.

FIG. 10 shows a schematic view of the component 1 from FIG. 1 with visible seventh winding pattern 107 in a first variant. An xy plane of component 1 is shown. In this first variant of the seventh winding pattern 107, the filament 6 is guided around the longitudinal axis A1 of the first arm 2 as a circumferential winding in an O-shape. It will be appreciated that the filament 6 can also be guided as circumferential winding around the longitudinal axis A2 of the second arm 2 or around the longitudinal axis A3 of the third arm 2 or around the longitudinal axis A4 of the fourth arm 2. It will be appreciated that a circumferential winding can be wound around each arm 2 in an O-shape according to the seventh winding pattern 107 in the first variant. In this regard, the filament is oriented substantially perpendicular to the longitudinal axis A1 of the first arm 2. The laminate at arms 2 is compacted by the seventh winding pattern 107 in the first variant. Further, a closed, planar surface of the laminate of component 1 is generated.

Figure 11:
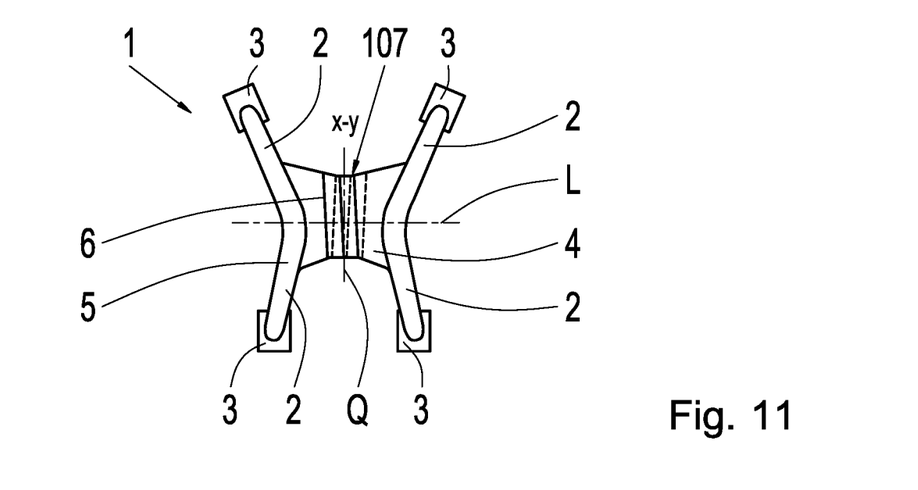
FIG. 11 is a schematic view of the component from FIG. 1 with visible seventh winding pattern in a second variant.

FIG. 11 shows a schematic view of the component 1 from FIG. 1 with visible seventh winding pattern 107 in a second variant. An xy plane of component 1 is shown. In this second variant of the seventh winding pattern 107, the filament 6 is wound around the torsion region 4 as a circumferential winding. The filament 6 is substantially perpendicular to the longitudinal axis L of the torsion region 4. The laminate of component 1 is compacted in the area of torsion region 4 by the seventh winding pattern 107 in the second variant. Further, a closed, planar surface is produced in this way.

Figure 12:
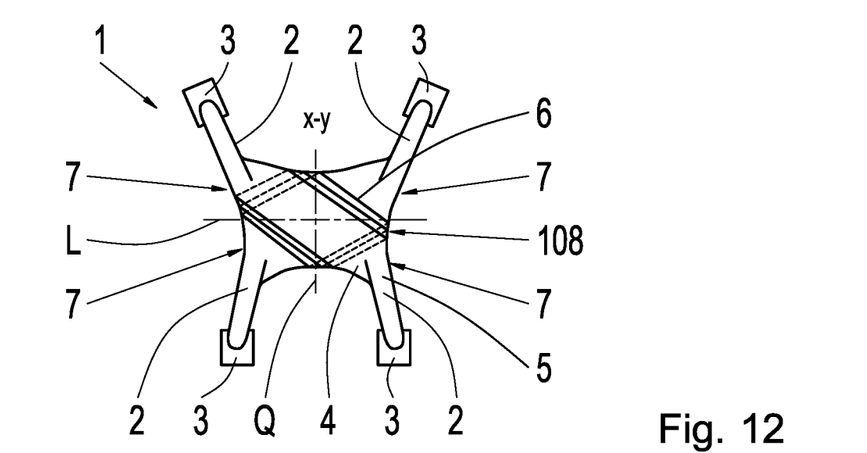
FIG. 12 is a schematic view of the component from FIG. 1 with visible eighth winding pattern.

FIG. 12 shows a schematic view of the component 1 from FIG. 1 with visible eighth winding pattern 108. An xy plane of component 1 is shown. The filament 6 is guided in four webs diagonal to the longitudinal axis L of torsion region 4 and diagonal to the transverse axis Q of torsion region 4. The filament is wound radially around the torsion region 4 of the core 5. Two webs of the filament 6 are arranged parallel to one another. Therefore, the filament 6 is laid down on the core 5 in the shape of a parallelogram. The filament 6 has an orientation of approximately 35° with respect to the longitudinal axis L of torsion region 4. A shear stiffness of the torsion region 4 can be selectively adjusted by the eighth winding pattern 108. Further, a load transfer can be carried out from the arms 2 into torsion region 4.

Figure 13:
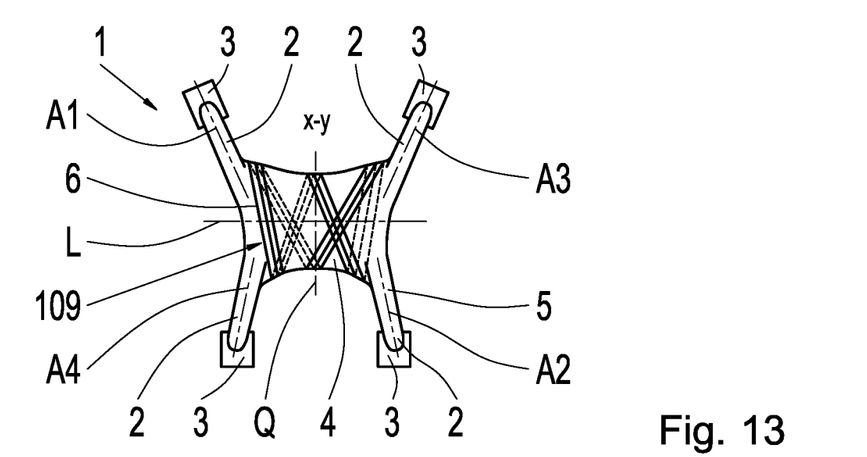
FIG. 13 is a schematic view of the component from FIG. 1 with visible ninth winding pattern.

FIG. 13 shows a schematic view of the component 1 from FIG. 1 with visible ninth winding pattern 109. An xy plane of the component 1 is shown. The filament 6 is laid down in such a way that it is substantially parallel to the longitudinal axis A1 of the first arm 2 and substantially parallel to the longitudinal axis A3 of the third arm 2. The filament 6 is guided radially around the torsion region 4 of the core 5. A circumferential winding is shown again. Filament 6 has, for example, an approximately 60° angle with respect to the longitudinal axis L of torsion region 4. It will be appreciated that the ninth winding pattern 109 can also be carried out in a mirror image across the longitudinal axis L of torsion region 4. In this case, the filament 6 would be arranged substantially parallel to the longitudinal axis A4 of the fourth arm 2 and substantially parallel to the longitudinal axis A2 of the second arm 2. A shear stiffness of the torsion region 4 is increased by the ninth winding pattern 109.

Figure 14:
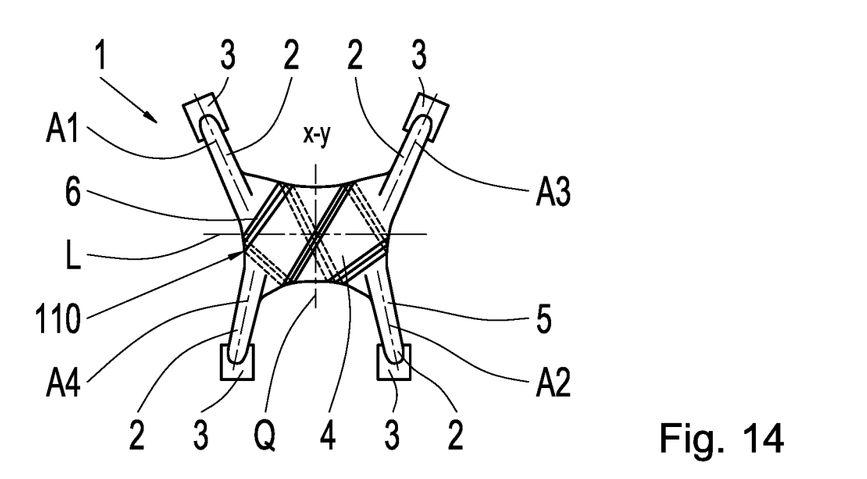
FIG. 14 is a schematic view of the component from FIG. 1 with visible tenth winding pattern.

FIG. 14 shows a schematic view of the component 1 from FIG. 1 with visible tenth winding pattern 110. An xy plane of the component 1 is shown. In this tenth winding pattern 110, the filament 6 is guided at torsion region 4 substantially parallel to the longitudinal axis A3 of the third arm 2. It will be appreciated that the tenth winding pattern 110 can also be carried out in a mirror image across the longitudinal axis L of torsion region 4. Further, the tenth winding pattern 110 can also be carried out in a mirror image across the transverse axis Q of torsion region 4. A shear stiffness of the torsion region 4 is increased by the tenth winding pattern 110.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a component by a 3D winding method, wherein the component has at least two arms, a bushing in each arm, and a torsion region connected to the at least two arms, comprising:

laying down a filament or a plurality of parallel filaments comprising a fiber-reinforced plastic composite material on a core in a combination of a plurality of different winding patterns, wherein every filament is preimpregnated and wherein every winding pattern influences at least one mechanical characteristic of the component;

selectively adjusting mechanical characteristics of the component by a repetition and a material selection of respective ones of the plurality of different winding patterns; and selectively adjusting mechanical characteristics of the component by a predetermined sequence and mixing of the plurality of different winding patterns, wherein two or more different winding patterns succeed one another to ensure a load transfer of a sub-portion of the component to another sub-portion of the component, anchoring the bushings at the core first by gluing the bushing to the core and then by guiding the filament in a winding pattern guided around each bushing as ring windings and cross windings, wherein the winding pattern guided around each bushing is different than the winding patterns of the at least two arms, wherein in a first winding pattern the filament is guided substantially parallel to a longitudinal axis of one of the arms, wherein in a second winding pattern the filament is guided substantially parallel to a longitudinal axis of a first one of the arms, substantially parallel to a longitudinal axis of a second one of the arms and in a web diagonal to a longitudinal axis of the torsion region.

2. The method according to claim 1, wherein the at least two arms lie opposite one another at the longitudinal axis of the torsion region.

3. The method according to claim 1, wherein the core is received at a robot arm, wherein the core is guided by the robot arm as the filament is being wound around the core.

4. The method according to claim 1, wherein the core is received at an axis, wherein the filament is guided by a robot arm in order to wind the filament around the core.

5. The method according to claim 1, wherein the core serves exclusively for providing a shape for deposition of the filament.

6. The method according to claim 5, wherein loads received at the bushings are only transmitted by the filaments.

7. A method for producing a component by a 3D winding method, wherein the component has at least two arms, a bushing in each arm, and a torsion region connected to the at least two arms, comprising:

laying down a filament or a plurality of parallel filaments comprising a fiber-reinforced plastic composite material on a core in a combination of a plurality of different winding patterns, wherein every filament is preimpregnated and wherein every winding pattern influences at least one mechanical characteristic of the component;

selectively adjusting mechanical characteristics of the component by a repetition and a material selection of respective ones of the plurality of different winding patterns; and selectively adjusting mechanical characteristics of the component by a predetermined sequence and mixing of the plurality of different winding patterns, wherein two or more different winding patterns succeed one another to ensure a load transfer of a sub-portion of the component to another sub-portion of the component, wherein in a first winding pattern the filament is guided substantially parallel to a longitudinal axis of one of the arms, wherein in a second winding pattern the filament is guided substantially parallel to a longitudinal axis of a first one of the arms, substantially parallel to a longitudinal axis of a second one of the arms and in a web diagonal to a longitudinal axis of the torsion region, wherein the at least two arms lie opposite one another at the longitudinal axis of the torsion region, wherein in a third winding pattern the filament is guided at transition areas of the torsion region to the arms diagonal to the longitudinal axis of the torsion region.

8. The method according to claim 7, wherein in a fourth winding pattern the filament is guided substantially parallel to the longitudinal axis of the first one of the arms, substantially parallel to a longitudinal axis of a third one of the arms and in two webs diagonal to the longitudinal axis of the torsion region, wherein the at least two arms are located opposite one another at a transverse axis of the torsion region.

9. The method according to claim 8, wherein in a fifth winding pattern the filament is guided at two arms located opposite one another at the transverse axis of the torsion region as at least one cross winding per arm and in two webs diagonal to the longitudinal axis of the torsion region.

10. The method according to claim 9, wherein in a sixth winding pattern the filament is guided around each bushing so that the bushings are anchored at the core.

11. The method according to claim 10, wherein in a seventh winding pattern the filament is guided as circumferential winding around at least one of the arms and/or around the torsion region.

12. The method according to claim 11, wherein in an eighth winding pattern the filament is guided at the torsion region in four webs diagonal to the longitudinal axis of the torsion region and diagonal to the transverse axis of the torsion region.

13. The method according to claim 12, wherein in a ninth winding pattern the filament is guided at the torsion region substantially parallel to respective longitudinal axes of at least two of the arms.

14. The method according to claim 13, wherein in a tenth winding pattern the filament is guided at the torsion region substantially parallel to the longitudinal axis of one of the arms.

15. A component having at least two arms, each of which has a bushing, and a torsion region which is connected to the at least two arms, wherein the component is produced by:

laying down a filament or a plurality of parallel filaments comprising a fiber-reinforced plastic composite material on a core in a combination of a plurality of different winding patterns, wherein every filament is preimpregnated and wherein every winding pattern influences at least one mechanical characteristic of the component;

selectively adjusting mechanical characteristics of the component by a repetition and a material selection of respective ones of the plurality of different winding patterns, selectively adjusting mechanical characteristics of the component by a predetermined sequence and mixing of the plurality of different winding patterns, wherein two or more different winding patterns succeed one another to ensure a load transfer of a sub-portion of the component to another sub-portion of the component, anchoring the bushings at the core by gluing and guiding the filament in a winding pattern guided around each bushing as ring windings and cross windings, wherein the winding pattern guided around each bushing is different than the winding patterns of the at least two arms, wherein in a first winding pattern the filament is guided substantially parallel to a longitudinal axis of one of the arms, and wherein in a second winding pattern the filament is guided substantially parallel to a longitudinal axis of a first one of the arms, substantially parallel to a longitudinal axis of a second one of the arms and in a web diagonal to a longitudinal axis of the torsion region.

16. The component according to claim 15, wherein the component is a component for a chassis of a vehicle.

* * * * *